United States Patent
Breiner et al.

(10) Patent No.: US 10,000,399 B2
(45) Date of Patent: Jun. 19, 2018

(54) DENITRIFICATION OF SALINE INDUSTRIAL WASTE WATER

(71) Applicant: Yara International ASA, Oslo (NO)

(72) Inventors: Hans-Werner Breiner, Kaiserslautern (DE); Thorsten Stoeck, Trippstadt (DE); Günther Doppelbauer, Moers (DE); Wolfram Franke, Porsgrunn (NO); Marina Ettl, Alpen-Veen (DE)

(73) Assignee: Yara International ASA, Oslo (NO)

( * ) Notice: Subject to any disclaimer, the term of this patent is extended or adjusted under 35 U.S.C. 154(b) by 47 days.

(21) Appl. No.: 15/310,639

(22) PCT Filed: May 13, 2015

(86) PCT No.: PCT/EP2015/060661
§ 371 (c)(1),
(2) Date: Nov. 11, 2016

(87) PCT Pub. No.: WO2015/173336
PCT Pub. Date: Nov. 19, 2015

(65) Prior Publication Data
US 2017/0081226 A1    Mar. 23, 2017

(30) Foreign Application Priority Data

May 14, 2014   (NO) .................................. 20140606

(51) Int. Cl.
| | | |
|---|---|---|
| C02F 3/34 | (2006.01) | |
| C02F 3/30 | (2006.01) | |
| C02F 101/12 | (2006.01) | |
| C02F 101/16 | (2006.01) | |
| C02F 103/08 | (2006.01) | |
| C02F 103/24 | (2006.01) | |
| C02F 103/34 | (2006.01) | |

(52) U.S. Cl.
CPC ............. *C02F 3/34* (2013.01); *C02F 3/305* (2013.01); *C02F 2101/12* (2013.01); *C02F 2101/163* (2013.01); *C02F 2103/08* (2013.01); *C02F 2103/24* (2013.01); *C02F 2103/34* (2013.01); *Y02W 10/37* (2015.05)

(58) Field of Classification Search
CPC ........... C02F 2101/12; C02F 2101/163; C02F 2103/08; C02F 2103/24; C02F 2103/34; C02F 3/305; C02F 3/34; Y02W 10/37
See application file for complete search history.

(56) References Cited

U.S. PATENT DOCUMENTS 4,356,092 A    10/1982    Shimizu et al.

FOREIGN PATENT DOCUMENTS

| CN | 101054232 A | 10/2007 |
|---|---|---|
| EP | 2 018 417 B1 | 3/2011 |
| KR | 2013 0108763 A | 10/2013 |
| WO | 2010/076794 A1 | 7/2010 |

OTHER PUBLICATIONS

International Search Report issued in PCT/EP2015/060661, dated Jul. 17, 2015 (3 pages).
Written Opinion of the International Searching Authority issued in PCT/EP2015/060661, dated Jul. 17, 2015 (6 pages).
International Preliminary Report on Patentability from PCT/EP2015/060661, dated Aug. 19, 2016 (6 pages).
Norwegian Search Report issued in NO 20140606 dated Nov. 17, 2014 (2 pages).
Peyton, B.M. et al.; "Nitrate Reduction with Halomonas campisalis: Kinetics of Denitrification at pH 9 and 12.5% NaCl"; Water Research, vol. 35, No. 17, XP004308102, Elsevier Ltd., Dec. 1, 2001, pp. 4237-4242 (6 pages).
Shi, K. et al.; "Performance of halophilic marine bacteria inocula on nutrient removal from hypersaline wastewater in an intermittently aerated biological filter"; Bioresource Technology, vol. 113, XP028417035, Elsevier BV, Jan. 20, 2012, pp. 280-287 (8 pages).
Cyplik, P. et al.; "Effect of macro/micro nutrients and carbon source over the denitrification rate of Haloferax denitrificans archaeon"; Enzyme and Microbial Technology, vol. 40, XP5777343A, Elsevier, 2007, pp. 212-220 (9 pages).
Foglar, L. et al.; "Nitrate removal with bacterial cells attached to quartz sand and zeolite from salty wastewaters"; World J Microbiol Biotechnol, vol. 23, 2007, pp. 1595-1603 (9 pages).
Osaka, T. et al.; "Effects of carbon source on denitrification efficiency and microbial community structure in a saline wasewater treatment process"; Water Research, vol. 42, XP24528741A, Elsevier, 2008, pp. 3709-3718 (10 pages).
Nair, R. et al.; "Biological denitrification of high strength nitrate waste using preadapted denitrifying sludge"; Chemosphere, Elsevier, vol. 67, 2007, pp. 1612-1617 (6 pages).
Okeke, B. et al.; "Reduction of perchlorate and nitrate by salt-tolerant bacteria"; Environmental Pollution, Elsevier, vol. 118, 2002, pp. 357-363 (7 pages).
Le Borgne, S. et al.; "Biodegradation of Organic Pollutants by Halophilic Bacteria and Archaea"; Journal of Molecular Microbiology and Biotechnology, vol. 15, 2008, pp. 74-92 (19 pages).
Tsang, W.L. et al.; "A novel sludge minimized biological nitrogen removal process for saline sewage treatment"; Water & Science Technology, vol. 59, No. 10, 2009, pp. 1893-1899 (7 pages).
Rezaee, A. et al.; "Denitrification of high salinity, high nitrate wastewater using clinoptilolite in a packed bed bioreactor"; Journal of Environmental Research and Management, vol. 3, No. 2, Mar. 2012, pp. 31-36 (6 pages).
Cyplik, P. et al.; "Biological Denitrification of High Nitrate Processing Wastewaters from Explosives Production Plant"; Water Air Soil Pollut, vol. 223, 2012, pp. 1791-1800 (10 pages).

*Primary Examiner* — Dirk Bass
(74) *Attorney, Agent, or Firm* — Osha Liang LLP

(57) ABSTRACT

The present invention concerns a biochemical process for the denitrification of a hypersaline wastewater composition.

15 Claims, 5 Drawing Sheets

DENITRIFICATION OF SALINE INDUSTRIAL WASTE WATER

INTRODUCTION

Figure 1:
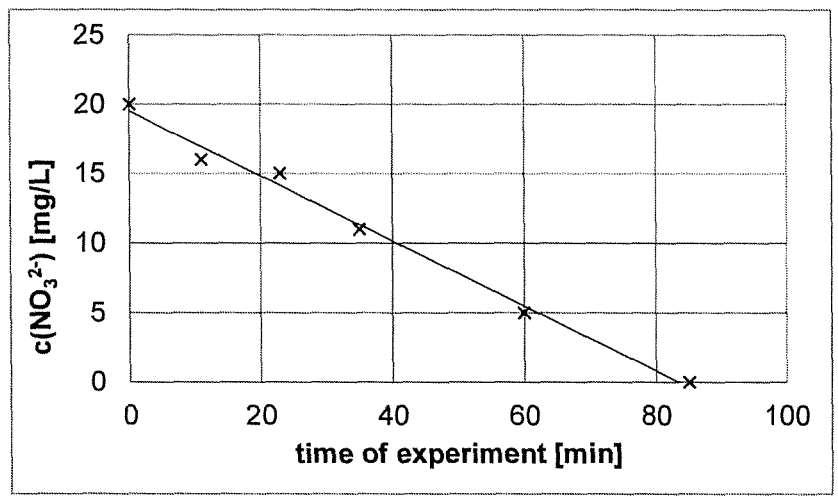

Industrial wastewater treatment processes focus on different aims, but generally, the target is the reduction of organic and inorganic contaminants. Industrial wastewater streams often contain few compounds but in high concentration and as a consequence, the treatment process needs to be very specialised.

The extent of treatment depends on legal demands. The municipality usually defines discharge regulations into sewer networks, and state authorities, like environmental protection agency, usually define discharge regulations into rivers, lakes and the open sea.

Discharge streams with high nitrate concentrations can also contain large amounts of other compounds such as chloride (from the fish canning industry, wet lime-gypsum desulphurization process, and regeneration liquid from ion exchange columns) and sulphate (from tannery waste).

Especially ion exchange processes can lead to wastewater streams that are heavily contaminated with inorganics. For instance, an ion exchange process to convert an alkali metal chloride and calcium nitrate into an alkali metal nitrate and calcium chloride leads to a high saline wastewater with high contamination of nitrate. In said ion exchange process, the alkali metal may be potassium or sodium.

Industrial wastewater treatment processes can be of physical (filtration, separation, ion-exchange), chemical (flocculation, neutralization, oxidation) or biochemical nature. Depending on toxicity of compounds and sustainability, the most suitable treatment process needs to be chosen. In many cases, a bio-chemical process is cost-efficient.

Bio-chemical industrial wastewater treatment requires:
Selection of species that are able to degrade the targeted pollutant;
Establishment of the optimal conditions for the selected species to perform their metabolism;
Supplying of substances to complement the nutrition and carbon supply.

Denitrification is a biochemical process that is common in nature as well as in wastewater treatment systems. The process under conventional wastewater conditions is, for instance, described in the Guideline ATV-DVWK-A 131 (Bemessung von einstufigen Belebungsanlagen. Edition 05/2000. DWA. Germany. ISBN: 978-3-933707-41-3). In the presence of nitrate and in the absence of oxygen, anoxic bacteria are able to use nitrate for the oxidation of organic compounds to support their metabolism. Hence, nitrate and bioavailable organic compounds are consumed during the process with the maintenance and production of biomass and the release of $CO_2$, $N_2$ and water.

The denitrification process consists of four steps:
Nitrate reduction $NO_3^- + 2 H^+ + 2e^- \rightarrow NO_2^- + H_2O$
Nitrite reduction $NO_2^- + 2 H^+ + e^- \rightarrow NO + H_2O$
Nitrogen oxide reduction $2 NO + 2 H^+ + 2 e^- \rightarrow N_2O + H_2O$
Dinitrogen oxide reduction $N_2O + 2H^+ + 2 e^- \rightarrow N_2 + H_2O$ Nitrite, one of the intermediates in the process, is toxic for many organisms. Especially in case of accumulation and following increased concentration, the nitrite can become a critical toxin for the nitrate reducing bacteria themselves. Under standard conditions, the nitrite reduction is performed quicker than the nitrate reduction, and therefore, under balanced conditions, an accumulation of nitrite is avoided. High concentrations of nitrate and an easily degradable carbon source lead in the first place to a high nitrite release and, consequently, to a nitrite toxicity-induced stop of the nitrate reduction.

It is known that high saline concentrations in wastewater have negative effects on biological denitrification. However, several halo-tolerant denitrifying bacteria have been isolated and identified in hypersaline waters. The higher the salinity of a habitat, the lower the number of specialized bacterial taxa that can survive or thrive in this habitat. In extreme environments, like crystallizer ponds of solar salterns, relatively few adapted species of halophilic bacteria can survive.

Also the water temperature has a high impact on the denitrification rate. Up to a certain limit, microbial activity increases with temperature. As nitrate and nitrite are in competition with oxygen as electron acceptor, contact of the medium with atmospheric oxygen-rich conditions should be avoided to achieve optimal denitrification rates. Hence, preferably, a biological denitrification process runs at a high temperature, which is, however, limited by the maximum survival temperature of the respective bacteria species involved. With few exceptions, denitrification is an anaerobic process.

The inventors have now identified a biochemical process for the denitrification of a hypersaline wastewater composition, comprising a concentration of at least 0.1% (w/v) of nitrate and a concentration of at least 5% (w/v) of chloride, using halophilic and/or halotolerant bacteria.

In this application, a hypersaline composition such as a wastewater, a brine and the like, is defined as comprising at least a concentration of 5% (w/v) of chloride ($Cl^-$) ions.

In this application, a composition comprising a high concentration of nitrate is defined as comprising at least a concentration of 0.1% (w/v) of nitrate ($NO_3^-$).

In this application, when reference is made to "nitrate" or "cloride", reference is made to the total amount of "nitrate" or "cloride" compounds present, being either in the form of ions or as non-dissociated compounds.

In this application, according to Le Borgne et al. (Biodegradation of Organic Pollutants by Halophilic Bacteria and Archaea, Journal of Molecular Microbiology and Biotechnology 2008; 15:74-922008), halophilic bacteria are classified as slightly halophilic when active in a NaCl concentration of 2 to 5% (w/v) (seawater has an average concentration of 3.5% (w/v)), moderate halophilic when active in a NaCl concentration of 5 to 20% (w/v) and extreme halophilic when active in a NaCl concentration of 20 to 30% (w/v). The majority of supplementary bacteria according to one or more embodiments of our invention can be classified as moderate to extreme halophilic bacteria. However, the microorganism community that was used in our experiments was a mixture of halophilic, halotolerant and non-specialized species, obtained from a mixture of activated sludge from the denitrification step of a municipal waste water treatment plan and from a saline sludge from the crystallizer pond of a solar saltern. Halophilic species require NaCl for growth, in contrast to halotolerant species, which do not require NaCl but can grow under saline conditions.

PRIOR ART

Literature indicates the specificity of the bio-treatment target and the resulting selection of the microorganisms, and that each bio-treatment target demands an individual adjustment of temperature, pH-value, micronutrients and species selected.

Okeke et al. (Reduction of perchlorate and nitrate by salt-tolerant bacteria. Environmental Pollution 118 (2002) 357-363) describe a wastewater bio-treatment process, optimized for removing perchlorate ions from a wastewater containing 100 mg/l $ClO_4^-$ (0.01% w/v) and 11.7 mg/l $NO_3^-$ (0.001% w/v). The nitrate removal efficiency was 16.4% for a co-culture of a salt tolerant Citrobacter bacterium and a non-salt tolerant, as "perclace" declared bacterium and 15.6% for a Citrobacter monoculture within 7 days. Acetate and yeast extract were used as carbon source. Recommended temperature to remove $ClO_4^-$ was 30° C. for 0-5% NaCl.

Cyplik P. et. al. (Effect of Macro/micro Nutrients and Carbon Source Over the Denitrification Rate of Haloferax Denitrificans Archaeon, Enzyme and Microbial Technology 40, 2007, 212-220) discloses denitrification of saline water by use of halotolerant bacteria only, in particular Haloferax Denitrificans Archaeon. The amount of NaCl cited is 2.5 to 3.5 M (14.5 to 20% (w/v)) and the amount of nitrate is 100-1000 mg/l. Neutral pH and a temperature of 37° C. are preferred.

Foglar et al. (Nitrate Removal with Bacterial Cells Attached to Quartz Sand and Zeolite from Salty Wastewater, World J Microbiol Biotechnol (2007) 23:1595-1603) discloses a study wherein a mixed bacterial culture is employed to remove nitrate from salt water. The amount of NaCl used in the experiments was 3% (w/v) and the amount of nitrate was 750 mg/l. A carbon source is added in some examples, the temperature is 37° C. and the pH is neutral. Mentioned bacteria include *Pseudomonas* sp and *Paracoccus* sp. The amount of chloride and the amount of nitrate is lower in this study than in one or more embodiments of the present invention and the decrease of nitrate concentration over time takes much longer (up to 10 days and more at 37° C.) than according to the current application.

Nair et al. (Biological denitrification of high strength nitrate waste using pre-adapted denitrifying sludge. Chemosphere 67 (2007) 1612-1617) showed that nitrate removal from a wastewater from a fertilizer production plant can be performed using an activated sludge technology. Tests showed that nitrate-containing sludge with a starting concentrations of up to 4% $NO_3^-$ can be treated fully in a time period of 6 h. However, no chlorides were present. The recommended temperature to remove $NO_3^-$ was 37° C.

Le Borgne et al. (Biodegradation of Organic Pollutants by Halophilic Bacteria and Archaea, Journal of Molecular Microbiology and Biotechnology 2008; 15:74-922008) presents an overview of the biodegradation of organic pollutants by halophilic bacteria. Denitrification is not disclosed.

Osaka et al. (Effects of Carbon Source on Denitrification Efficiency and Microbial Community Structure in a Saline Wastewater Treatment Process, Water Research 42, 2008, 3709-3718) disclose an academic study of the biological denitrification of saline water focusing on selecting the right carbon source. Acetate is preferred when the NaCl concentration is 0-10%. The bacterial culture is obtained from a synthetic waste water sludge activated with NaCl under laboratory conditions. The amount of nitrate is 1.5 g/l. Different microbial species are disclosed for either methanol-fed (*Azoarcus, Hyphomicrobium, Methylophage* and *Paracoccus*) or acetate-fed (*Azoarcus, Marinobacter* and *Halomonas*) reactors that play a role in the denitrification.

Tsang et al. (A novel sludge minimized biological nitrogen removal process for saline treatment. Water Science & Technology, Vol. 59, Issue 10, 2009; pp. 1893-1899) describes a multistage process to treat saline sewage, comprising amounts of sulphate (0.05% w/v) with focus on the removal of organic contaminants. Chloride salts are not mentioned.

Rezaee et al. (Denitrification of high salinity, high nitrate wastewater using clinoptilolite in a packed bed bioreactor. Journal of Environmental Research and Management Vol. 3(2). pp. 031-036, March, 2012) described the treatment of high strength nitrate, high salinity wastewater (up to 4% w/v) using a packed bed bioreactor filled with clinoptilolite as a carrier and showed that a 500 mg/l (0.05% w/v) nitrate inflow can successfully be treated. The temperature was 25° C.

Cyplik et al (Biological Denitrification of High Nitrate Processing Wastewaters from Explosives Production Plant. Water Air Soil Pollution (2012) 223:1791-1800) discloses the biological denitrification of high nitrate processing wastewaters from an explosives production plant and showed that nitrate removal can be established for a high nitrate contaminated waste water. 3 g/L of N (from $NO_3^-$) were removed within 16 days in the presence of nitroglycerine and a low level (21 mg/l) of chlorides. A temperature level is not given, so standard lab conditions (20° C.) can be assumed.

U.S. Pat. No. 4,356,092 (1982) discloses a biological wastewater treatment process, but has no focus on nitrate removal. It comprises the steps of culturing a novel strain, *Alcaligaenes faecalis* HRL-1, and adding the cultured cells to to-be-treated wastewater. Salinity is not discussed.

Also EP 2018417 B1 (2007) discloses a novel strain CNCM 1-3448 of *Alcaligenes faecalis*, capable of the conversion of Kjeldahl nitrogen, ammonia nitrogen and/or nitrogen oxides into gaseous nitrogen, and the conversion of the carbon-containing matter into carbon dioxide, wherein both conversions taking place under aerobic conditions. Salinity is not discussed.

CN 101054232 A (2007) discloses a highly efficient biological waste water treatment process for hypersaline waste water, generating an aerobic granular sludge in a sequencing batch reactor without the use of halophilic bacteria, so hypersaline waste water can be processed effectively and the resistance to salinity shock of the system can be improved.

WO 2010/076794 A1 (2010) discloses a method for denitrifying brine by adding halotolerant, anaerobic bacteria. The denitrification takes place at neutral pH conditions and a carbon source is added, at a temperature of about 37° C. The process is performed in a fluidized bed bioreactor. The brine treated contains only 0.5 to 4% salt, 2 g/l chloride, and 0.05 g/l nitrate (as N), which is far less than in one or more embodiments of the present invention.

The prior art does not disclose a biochemical process that focuses on quick nitrate removal in the presence of a high concentration of chlorides for an inorganic wastewater treatment using a specific combination of bacteria.

DETAILED DESCRIPTION OF THE INVENTION

One or more embodiments of the present invention relate to a biochemical process for the denitrification of an hypersaline wastewater composition comprising a high concentration of nitrate in the presence of a high concentration of chloride.

According to one or more embodiments of the invention, an hypersaline wastewater composition comprising a high concentration of nitrate is subjected to a biochemical treatment, wherein said high concentration of nitrate, in the presence of a high concentration of chloride, is reduced to a lower concentration, preferably in a short time, by exposing said hypersaline wastewater composition to halophilic and/or halotolerant bacteria.

According to the one or more embodiments of invention, a biochemical process is disclosed for the denitrification of an hypersaline wastewater composition, comprising a concentration of at least 0.1% (w/v) of nitrate and a concentration of at least 5% (w/v) of chloride, using halophilic and/or halotolerant bacteria.

According to one or more embodiments, a biochemical process is disclosed for the denitrification of a hypersaline wastewater composition, originating from an ion exchange process, comprising a concentration of at least 0.1% (w/v) of nitrate and a concentration of at least 5% of chloride (w/v), using halophilic and halotolerant bacteria.

According to one or more embodiments, the concentration of nitrate is at least 0.20% (w/v), more preferably 0.25% (w/v).

The treatment is performed by a community of bacteria and not by one single genus of bacteria. Considering the high salinity, it is reasonable to assume that all members of the active community are at least halo-tolerant, most likely either halophilic or halotolerant, preferably both halophilic and halotolerant, and optionally the active community also contains non-specialized members. A community was selected over time from a sludge mix of ordinary denitrifying activated sludge from a municipal wastewater treatment plant and saline sediment sludge from the crystallizer pond of a solar saltern in Ses Salines, Spain. About 85 to 95 weight %, more preferably about 90 weight % of the sludge consists of activated sludge from the denitrification step of a municipal wastewater treatment plant. About 5 to 15 weight %, more preferably about 10 weight % of the sludge consists of sediment from the crystallizer pond of a solar saltern, including natural halophilic denitrifying bacteria. The cultivation and selection process is done by increasing the calcium chloride and potassium nitrate concentration gently over time up to the desired level at a constant temperature of 35° C. to 40° C., and preferably 37° C.

Even though a large proportion (69 weight %) of the solar saltern bacteria remains unidentified with short taxonomic marker genes (V4-V6 of SSU rDNA), using Illumina MySeq paired-end sequencing, numerous bacteria could be assigned to the following genera with certainty: *Pseudomonas* (abundance: 19 weight %), *Bacillus* (abundance: 4 weight %) and *Halomonas* (abundance: 3 weight %), and optionally with minor (1 weight % or less) abundance *Rhodobacter, Arthrobacter, Flexibacter, Propionibacterium, Enterobacteriaceae, Flavobacterium, Bradyrhizobium, Hyphomicrobium, Lysobacter, Sinorhizobium, Azospirillum, Thiobacillus, Sphingobacter, Paracoccus, Aeromanas, Ochrobacterium, Nitrosomonas, Herbaspirillum, Janthinobacterium, Lactobacillus, Nitrobacter, Cellulomonas, Streptomycetes, Cytophaga, Thiomicrospira, Beggiatoa, Cellvibrio, Moraxella, Alteromonas, Kingella, Aquaspirillium, Norcadia* and *Azoarcus* were detected. Considering the high salt concentrations under which denitrification occurred, it is reasonable to assume that all active denitrifiers were either halotolerant or halophilic.

The process operates at 35° C. to 40° C., preferably at about 37° C. when optimal performance was recorded.

Preferably, the process uses potassium acetate as a carbon source, but methanol or ethanol are also options, although less preferred in an industrial setup because of the higher costs.

Nutrients are not added to the system as the specific selection process of denitrifiers requires predominantly nitrate. Trace elements, as well as phosphates, were sufficiently presented in the input sludge. In a large-scale application with constant treatment of the wastewater and input sludge only in the beginning to establish the process, an additional input of trace elements and phosphate may be necessary.

With the process according to one or more embodiments of the invention, it was shown that an initial nitrate concentration of 1.5 to 3.0 g/l could be reduced to a concentration of about 0.001 g/l within 24 to 48 hours, especially when a sludge mix consisting for about 85 to 95 weight %, more preferably about 90 weight % of activated sludge from the denitrification step of a municipal waste water treatment plan and for about 5 to 15 weight %, more preferably about 10 weight % of saline sludge from the crystallizer pond of a solar saltern, was used.

The process according to one or more embodiments of the invention is performed in a bioreactor in a conventional way, known to the skilled person. The bioreactor can be either a suspended sludge or floating bed reactor type. In this process, the carbon source is added as main nutrient to fulfil the conditions for a biochemical nitrate reduction. The operation can be batchwise or in a continuous mode.

The wastewater that has to be treated can be produced in an ion exchange plant. In the production process, potassium chloride or sodium chloride react with calcium nitrate and deliver potassium nitrate or sodium nitrate as products and a calcium chloride solution as waste material. The wastewater stream needs a distinct treatment, as the contamination of nitrate is too high for untreated discharge.

The following figures are referred to in this description.

FIG. 1: Denitrification under standard conditions (no addition of carbon source, room temperature) in the 2-L microcosm setup as described (Experiment A).

Figure 2:
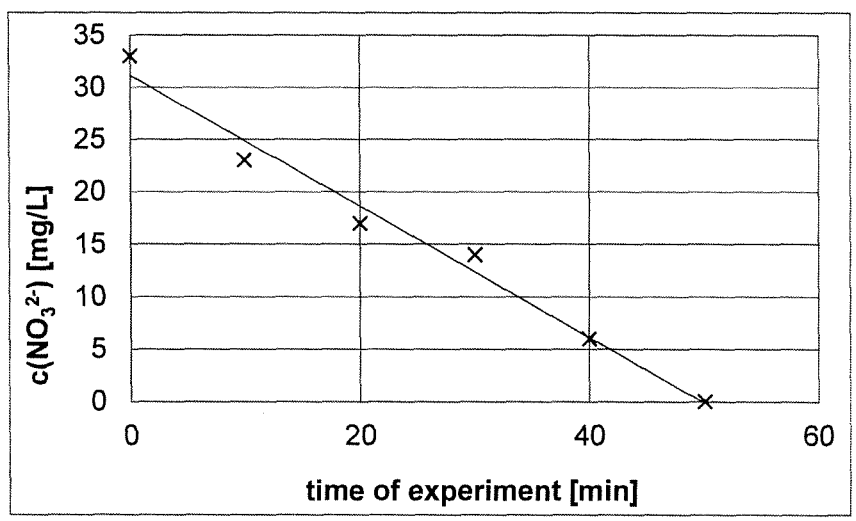

FIG. 2: Denitrification in the 2-L microcosm setup with addition of MeOH (10 ml/l) as carbon source at room temperature (Experiment B).

Figure 3:
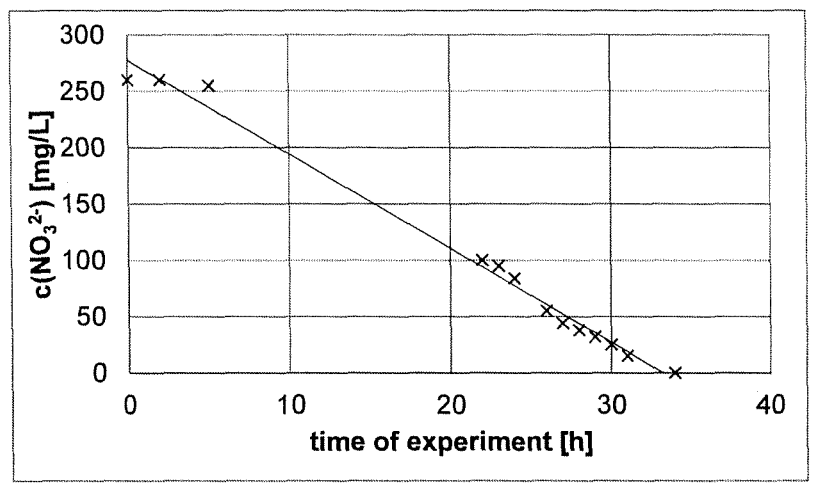

FIG. 3: Denitrification in the 2-L microcosm setup at a nitrate concentration of 260 mg/l (Experiment C).

Figure 4:
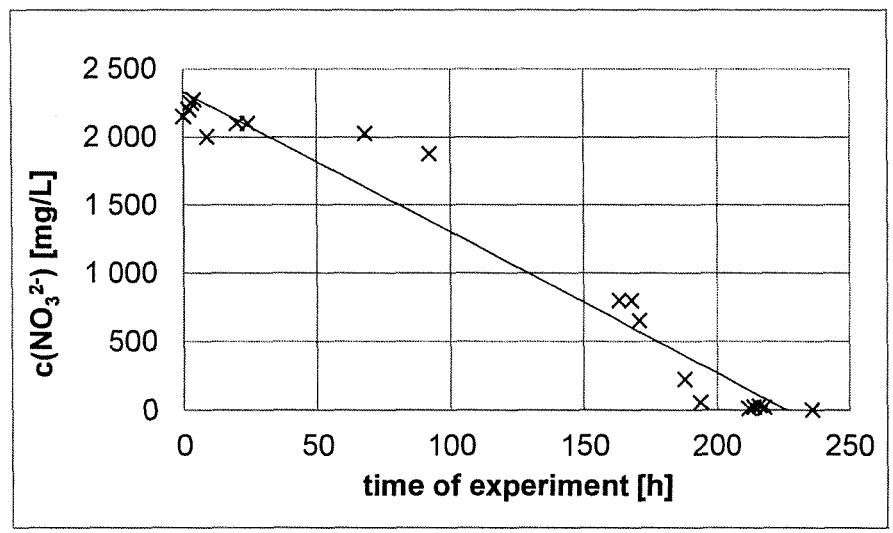

FIG. 4: Denitrification in the 2-L microcosm setup at a nitrate concentration of 2,200 mg/l (Experiment D).

Figure 5:
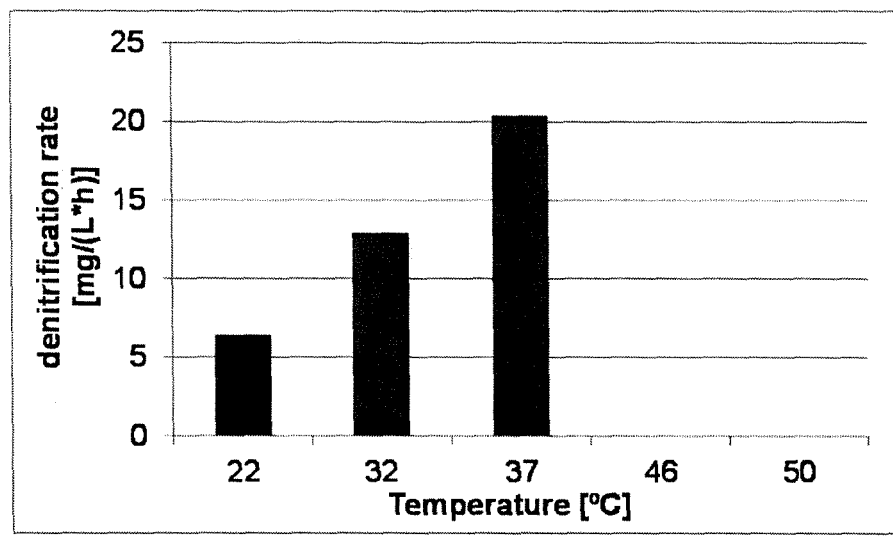

FIG. 5: Assessing the effect of temperature on denitrification rate in an experimental 2-L microcosm setup (Experiment E).

Figure 6:
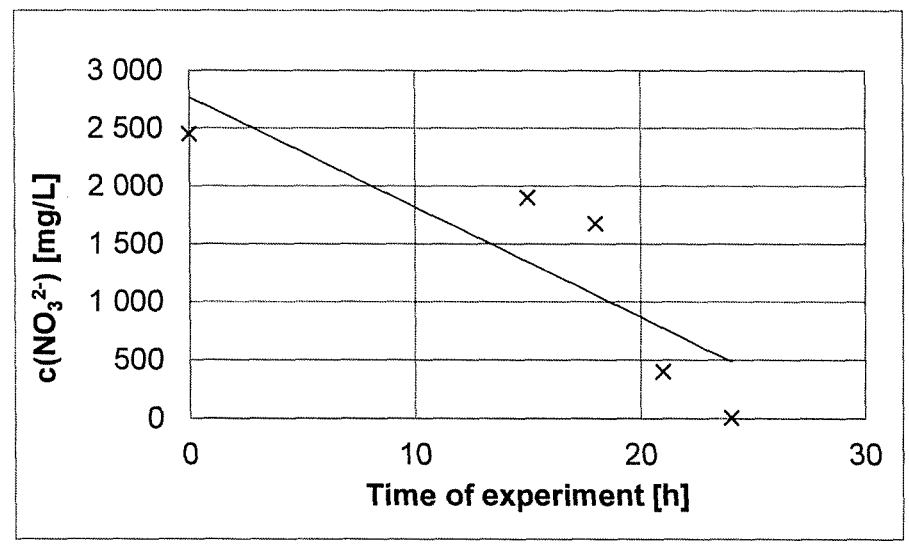

FIG. 6: Assessing the effect of KAc as a carbon source (Experiment F).

Figure 7:
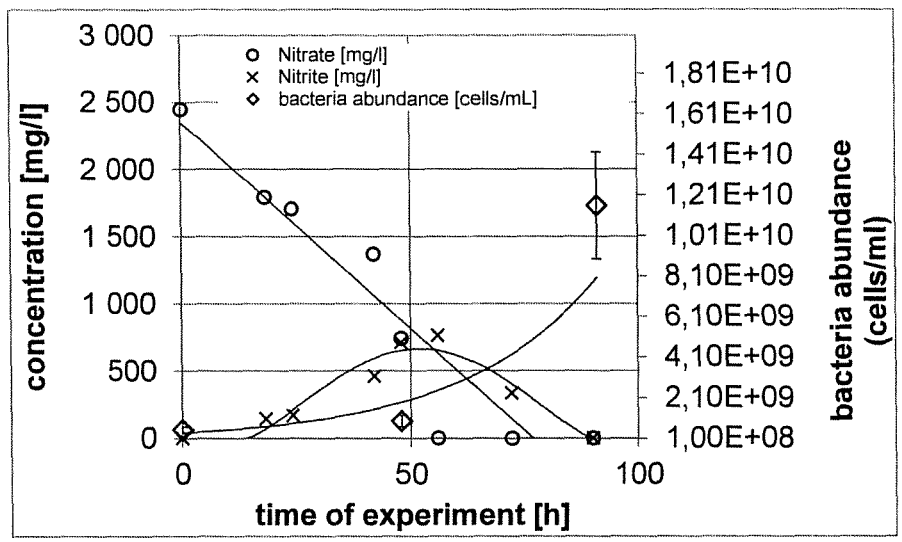

FIG. 7: Denitrification under high salt conditions (Experiment G) without significant halophilic and/or halotolerant bacteria (not according to one or more embodiments of the invention).

Figure 8:
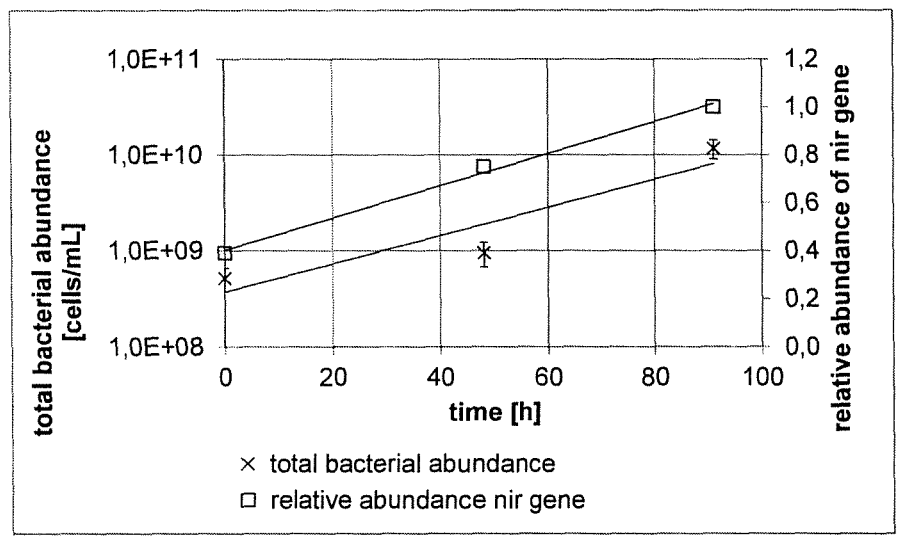

FIG. 8: Total bacterial abundance (x) and relative abundance of denitrifying bacteria (□) in Experiment G, as measured photometrically (left) and using DAPI stains (right).

Figure 9:
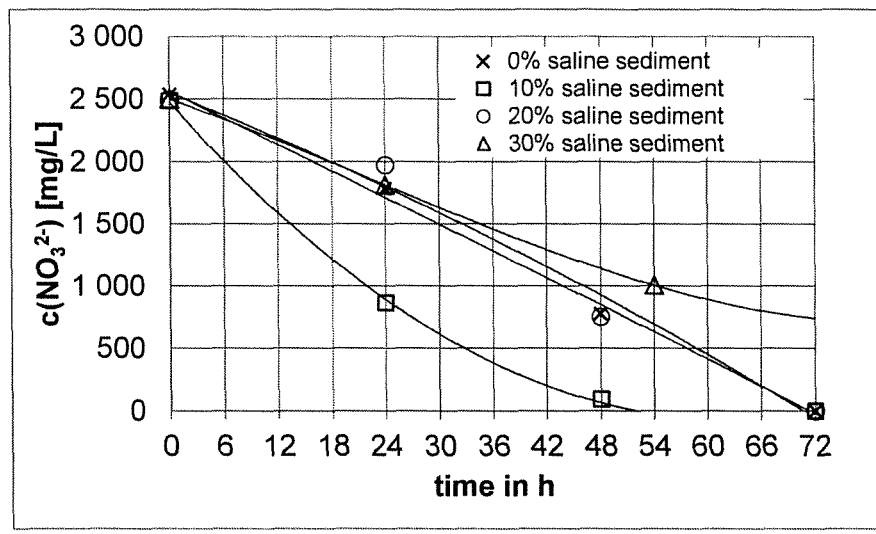

FIG. 9: Denitrification rates for different sediment substitution pro-portions according to one or more embodiments of the invention (Experiment H).

Figure 10:
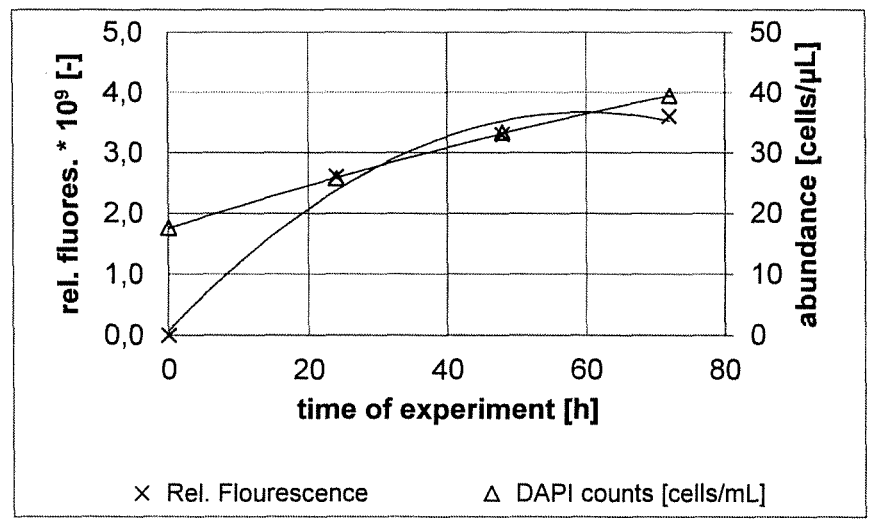

FIG. 10: Total bacterial abundance (x) and abundance of denitrifying bacteria (Δ) in Experiment H, as measured photometrically (left) and using DAPI stains (right).

EXPERIMENTAL

General

A production process of potassium nitrate is performed by ion exchange from potassium chloride and calcium nitrate, the process delivering a wastewater stream of high salinity due to calcium chloride and high contamination of nitrate. A biological treatment of this wastewater stream with a maximum conversion of the nitrate to gaseous nitrogen was to determine.

Goal of this experiment is the assessment and establishment of a microbial environment capable of complete denitrification at high salt concentrations. Wastewater specifications include 2.5 g nitrate/l wastewater (0.25% w/v), 91 g $CaCl_2$/l (5.7% w/v of Cl-ions) wastewater and temperatures exceeding 50° C. and lack of carbon source in the incoming industrial wastewater. Potassium acetate as an additional carbon source was added as 30 ml/l.

The proposed strategy to conduct the experiment was the establishment of a closed controlled laboratory system (2 liter microcosm, in the following 2-L-microcosm) mimicking activated sludge bioreactor conditions. The experimental setup of the 2-L microcosm included the possibilities to control oxygen concentrations (maintain anoxia), pH values (a range between 6.5 and 8.5 is mandatory for efficient denitrification) and temperature. Therefore, the setup was designed with permanent online pH-, oxygen- and temperature sensors, a stirring unit, access for sub-sampling without oxygen contamination, and access for argon flushing in case of accidental oxygenation events.

Activated sludge from the Wastewater Treatment Plant (WWTP) of Kaiserslautern (Germany) was used as a basis for a microbial environment (2.5 L volume in each experiment). For the sediment containing the natural halophilic denitrifying bacteria, sediment from the crystallizer pond of a solar saltern from Ses Salines, Spain, was used.

During experiments, samples were taken at different time intervals for nitrate and nitrite measurements (ion chromatography and photometry), total bacterial abundances (using DAPI stains), relative abundance of nitrite reductase (nir) genes, which indicate the abundance of denitrifying bacteria, and molecular microbial community profiling (Illumina ribosomal RNA sequencing and statistical community structure analyses). During the experiments, the pH had to be adjusted with KOH due to slight acidification of the microbial environment.

Nitrate concentrations were measured photometrically under low salt loadings, and using ion chromatography under high salt loadings.

Experiment A: Standard Denitrification without Sample Manipulation in a Controlled 2-L Microcosm Setup.

This experiment served as a control for the functioning of the 2-L microcosm system under standard conditions at ambient (room) temperature. Denitrification was performed under standard conditions (no addition of carbon source, room temperature) in the 2-L microcosm setup. 20 mg nitrate/l were added, corresponding to nitrate concentrations usually prevailing in the incoming wastewater in the WWTP.

The results are shown in FIG. 1. In the established experimental setup, 20 mg nitrate/l wastewater was denitrified within 85 minutes. Denitrification rate was 14.1 mg/l/h.

Conclusion:

The experimental setup is ideally suited to conduct the experiments because denitrification in the 2-L microcosm is as efficient as under usual conditions in a well-functioning WWTP.

Experiment B: Addition of Methanol (MeOH, 10 ml/l) as Additional Carbon Source to Assess the Effect of this Carbon Source on Denitrification Rate.

The experimental conditions are as in Experiment A with slightly elevated nitrate concentrations (33 mg/l). The results are shown in FIG. 2. Complete denitrification of 33 mg nitrate/l is completed after 50 min. Slope of trendline is steeper compared to experiment under standard conditions (without addition of extra carbon source). The denitrification rate is 39.8 mg/l/h.

Conclusion:

Additional carbon source (methanol) enhances the denitrification distinctly. Variation of carbon source concentration did not positively affect the denitrification rate in further experiments.

Experiment C: Increase of Nitrate Concentration to 260 mg/l (Exceeding Natural Conditions Ca. 10-Fold)

The results are shown in FIG. 3. Complete denitrification is still possible at a highly elevated nitrate concentration. However, the time for the complete denitrification of 260 mg nitrate/l runs up to 34 hours. The denitrification rate is 7.4 mg/l/h.

Conclusion:

Microbial processes at such elevated nitrate concentrations are distinctly lower compared to Experiment A with nitrate concentrations similar to a microbial environment. It seems likely that the abundance of naturally-occurring bacteria in the experimental setup is too low for an efficient denitrification.

Experiment D: Increase of Nitrate Concentration to 2,200 mg/l

The results are shown in FIG. 4. Complete denitrification is still possible at a highly elevated nitrate concentration. However, the time for the complete denitrification of 2,200 mg nitrate/l runs up to 200 hours. The denitrification rate is 9.3 mg/l/h.

Conclusion:

The denitrification rate is in the same order of magnitude as in Experiment C with an about 10-fold lower nitrate concentration. This is too low for a standard application in a WWTP process for removal of such high nitrate loads. Also, from this experiment it seems likely that the abundance of naturally occurring bacteria in the experimental setup is too low for an efficient denitrification. Therefore, further experiments are conducted in order to increase bacterial abundance and activity.

Experiment E: Assessing the Effect of Temperature on Denitrification Rate in an Experimental 2-L Microcosm Setup.

Several experiments were conducted with an initial nitrate concentration of about 1000 mg/l to assess the effect of temperature on denitrification rate in an experimental 2-L microcosm setup. The results are shown in FIG. 5. The highest denitrification rates were achieved at 37° C. Denitrification rate: 20.4 mg/l/h. Denitrification is inhibited at higher temperatures.

Conclusion:

A temperature of 37° C. results in increased bacterial densities and activities in an experimental setup. As a consequence, denitrification rates are in the same order of magnitude as under "standard conditions" (see Experiments A and B) even at extremely elevated nitrate concentrations. However, this rate is still too low for an efficient nitrate removal of such high concentrations in industrial processes. Further experiments were conducted.

Experiment F: Assessing the Effect of the Carbon Source.

MeOH is not appropriate as carbon source in industrial application (cost and safety issues). Therefore, Experiment F is conducted in order to evaluate potassium acetate (KAc) as an alternative carbon source. In all experiments KAc was added at a defined ratio: C:N=1.5:1. The results are shown in FIG. 6. The denitrification rate is 102 mg/l/h, with KAc as carbon source, temperature at 37° C. and extreme nitrate concentration.

Conclusion:

This is the highest denitrification rate obtained this far and significantly exceeds standard values for denitrification in WWTP reported in the scientific literature. Therefore, we conclude that KAc as carbon source and an optimal temperature of 37° C. is very efficient to enhance microbial denitrification.

Experiment G: Denitrification Under High Salt Conditions without Significant Halophilic and/or Halotolerant Bacteria (not According to One or More Embodiments of the Invention).

Denitrification under high salt conditions was done with a $CaCl_2$ concentration of 91 g/l (5.7% w/v of Cl-ions), a nitrate concentration of 2.5 g/l (0.25% w/v), KAc as a carbon source and at a temperature of 37° C. The results are shown in FIG. 7. The denitrification rate is 43.7 mg/l/h. A significant increase in bacterial abundance and denitrifier abundance in the wastewater during the course of the experiment was observed. This was determined using quantitative real time PCR of the nir gene (nitrite reductase, see Saggar et al. Sci. Total Environ), encoding a part of the denitrification process, and total bacterial load, as determined by DAPI-abundance, calculated from 5 replicates per sample. The results are shown in FIG. 8. The figure displays (relative) abundance data in the experimental setup for Experiment G.

Conclusion:

The biomass of specifically denitrifying bacteria increases 2.5 fold over the course of the experiment.

Experiment H: Substitution of Activated Sludge with Solar Saltern Sediment Including Natural Halophilic Denitrifiers.

Activated sludge from the Waste Water Treatment Plant (WWTP) of Kaiserslautern (Germany) was substituted with sediment from the crystallizer pond of a solar saltern from Ses Salines, Spain, including natural halophilic denitrifiers. The results are shown in FIG. 9. The substitution with 10 volume % of sediment containing natural halophilic denitrifiers increased the denitrification rate compared to the Experiment G. The denitrification rate was 51.8 mg/l/h. Surprisingly, increasing the relative proportion of sediment containing natural halophilic denitrifiers (experiments were done for 20 and 30 volume %, see FIG. 9) did not increase the denitrification rate, but significantly inhibited the denitrification instead.

Furthermore, the biomass of specifically denitrifying bacteria increased 3.5 fold over the course of the experiment (see FIG. 10). It can be seen that with the process according to one or more embodiments of the invention, using 10% saline sediment, an initial nitrate concentration of 2.5 g/l is reduced to a concentration of about 1 g/l after 24 hours, and to a concentration of about 0.001 g/l after 48 hours.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A biochemical process for denitrification of a hypersaline wastewater composition comprising a nitrate concentration of at least 0.1% (w/v) and a chloride concentration of at least 5% (w/v), comprising a step of using a community of halophilic and/or halotolerant bacteria comprising at least the following genera: *Pseudomonas*, *Bacillus* and *Halomonas*, for the denitrification of said hypersaline wastewater composition.

2. The process according to claim 1, wherein said community is selected from a sludge mix consisting of about 85 to 95 weight % of activated sludge from the denitrification step of a municipal waste water treatment plant and of about 5 to 15 weight % of saline sludge from a crystallizer pond of a solar saltern.

3. The process according to claim 1 for treatment of hypersaline waste water originating from an ion exchange process.

4. The process according to claim 1, wherein the nitrate concentration is at least 0.20% (w/v).

5. The process according to claim 1 for treatment of hypersaline waste water originating from a production process utilising potassium chloride and calcium nitrate to produce a calcium chloride and nitrate containing waste water stream.

6. The process according to claim 1 for treatment of hypersaline waste water originating from a production process utilising sodium chloride and calcium nitrate to produce a calcium chloride and nitrate containing waste water stream.

7. The process according to claim 1, wherein said community is selected from a sludge mix consisting of about 90 weight % of activated sludge from a denitrification step of a municipal waste water treatment plan and of about 10 weight % of saline sludge from a crystallizer pond of a solar saltern.

8. The process according to claim 1, wherein the halophilic bacteria are selected from the genera of *Pseudomonas* (abundance: 19 weight %), *Bacillus* (abundance: 4 weight %) and *Halomonas* (abundance: 3 weight %), and optionally with minor (1 weight % or less) abundance *Rhodobacter, Arthrobacter, Flexibacter, Propionibacterium, Enterobacteriaceae, Flavobacterium, Bradyrhizobium, Hyphomicrobium, Lysobacter, Sinorhizobium, Azospirillum, Thiobacillus, Sphingobacter, Paracoccus, Aeromanas, Ochrobacterium, Nitrosomonas, Herbaspirillum, Janthinobacterium, Lactobacillus, Nitrobacter, Cellulomonas, Streptomycetes, Cytophaga, Thiomicrospira, Beggiatoa, Cellvibrio, Moraxella, Alteromonas, Kingella, Aquaspirillium, Norcadia* and *Azoarcus*.

9. The process according to claim 1, wherein said process operates at 35° C. to 40° C.

10. The process according to claim 1, wherein potassium acetate is used as a carbon source.

11. The process according to claim 1 wherein an initial nitrate concentration of 1.5 to 3.0 g/l is reduced to a concentration of about 0.001 g/l within 24 to 48 hours.

12. The process according to claim 1, wherein the process is performed in a bioreactor of a suspended sludge reactor type.

13. The process according to claim 1, wherein the process is performed in a bioreactor of a floating bed reactor type.

14. The process according to claim 4, wherein the nitrate concentration is 0.25% (w/v).

15. The process according to claim 9, wherein said process operates at about 37° C.

* * * * *